J. H. REED.
DIRIGIBLE LIGHT APPARATUS FOR AUTOMOBILES.
APPLICATION FILED JUNE 8, 1917.
1,242,042.
Patented Oct. 2, 1917.
2 SHEETS—SHEET 1.
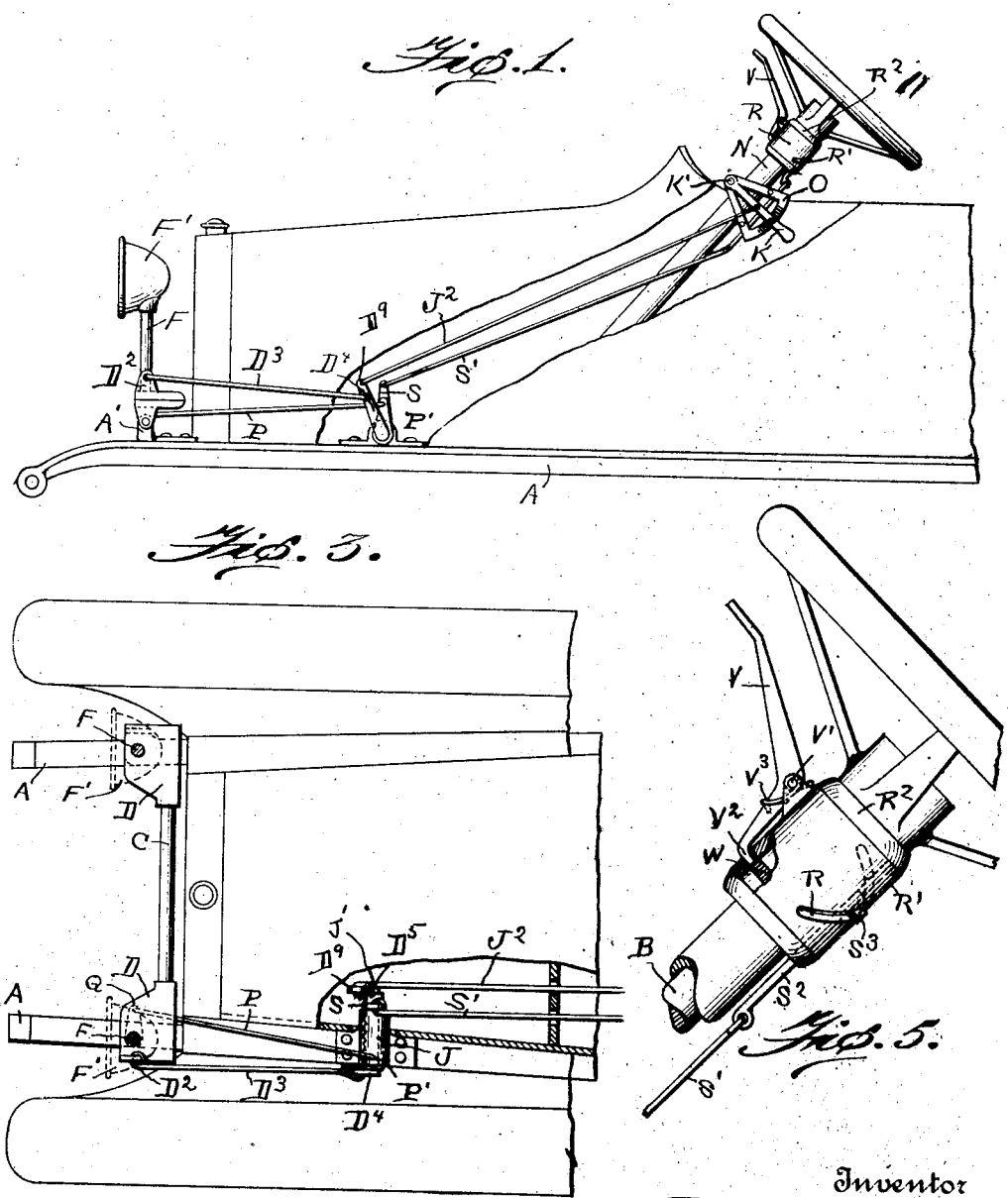
Witness
Inventor
J. H. Reed

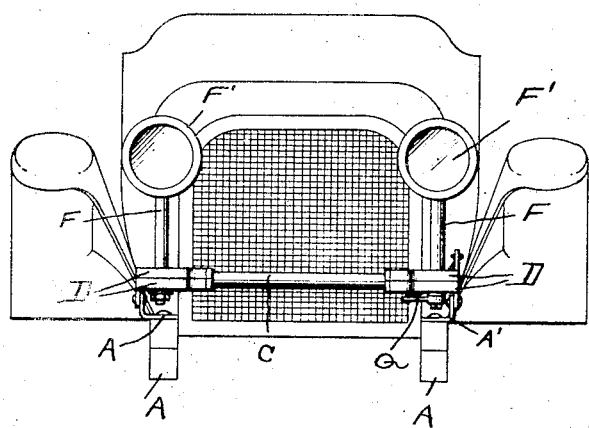
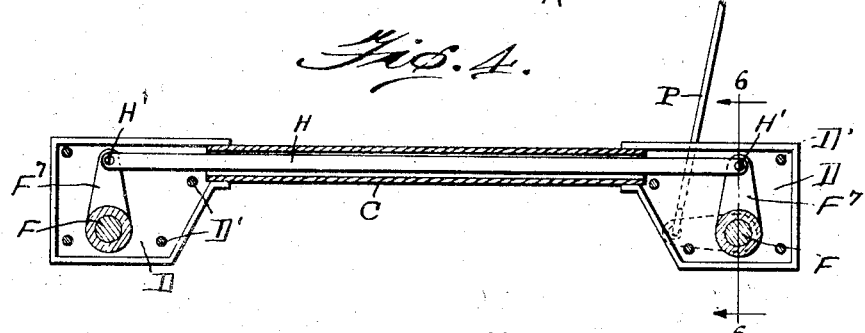
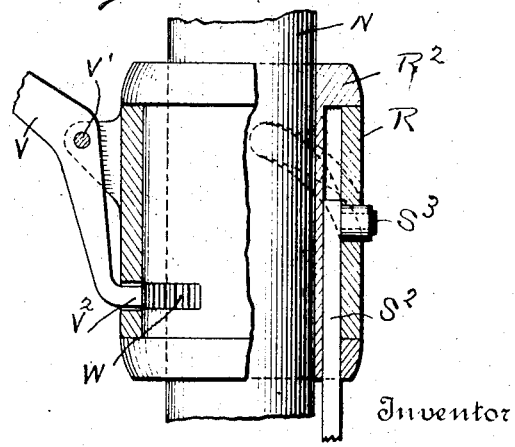

UNITED STATES PATENT OFFICE.

JOHN HENRY REED, OF VAN WERT, OHIO.

DIRIGIBLE-LIGHT APPARATUS FOR AUTOMOBILES.

1,242,042.   Specification of Letters Patent.   Patented Oct. 2, 1917.

Application filed June 2, 1917. Serial No. 175,526.

*To all whom it may concern:*

Be it known that I, JOHN H. REED, a citizen of the United States, residing at Van Wert, in the county of Van Wert and State of Ohio, have invented certain new and useful Improvements in Dirigible-Light Apparatus for Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in manually-operated, dirigible lights for vehicles and consists in the provision of a simple and efficient device of this nature having various details of construction, combinations and arrangements of parts which will be hereinafter fully described, shown in the accompanying drawings and then specifically defined in the appended claims.

My invention is illustrated in the accompanying drawings, in which:—

Figure 1 is a side elevation showing the mechanism as applied to an automobile.

Fig. 2 is a front elevation of the auto with the lights applied.

Fig. 3 is a top plan view of the portion of the auto with the apparatus applied.

Fig. 4 is a longitudinal sectional view through a hollow rocking shaft carrying the lights.

Fig. 5 is an enlarged detail in elevation of the mechanism upon the steering handle for operating the rods which actuate the rock shaft.

Fig. 6 is a cross sectional view through the steering shaft, showing parts in elevation.

Fig. 7 is a detail of the mechanism shown in Fig. 5.

Reference now being had to the details of the drawings by letter, A designates the side bars of an automobile and B the steering shaft. Bracket members, designated by letter A', are mounted upon said bars, and C designates a hollow rock shaft to which the two complemental shell sections D are fastened together by means of bolts D' and form housings in which a collar F³ having bosses F⁴ is journaled. Said shaft F, as shown clearly in Fig. 6 of the drawings, has a squared portion F², which passes through a similar shaped opening in the collar F³, and Q is a crank arm which is fitted to the projecting end of the squared portion of the shaft and held thereon through the medium of the screw F⁵. An arm F⁷ projects from the collar F³ and is pivotally connected to the bar F⁸ through the medium of the pin F¹, which latter is connected with a similar arm F⁷ on the other lamp post, as shown in Fig. 4 of the drawings. A rod P is pivotally connected at one end to the crank arm Q and its other end to an arm P', secured to a hollow shaft D⁵ journaled in the bearing J. A crank arm S is fixed to the hollow shaft D⁶ and S' designates a rod pivoted at one end to the crank arm S and its other end is connected to a bar S² carrying a lug S³ movable in an inclined slot R formed in the cylindrical shell R', which is journaled upon the casing N, as shown clearly in Figs. 5 and 7 of the drawings. The handle V is pivotally connected with the pin V' on brackets projecting from the shell R' and the inner end of the lever V is bent as at V², and engages the teeth W formed in the bottom of the recessed member R² which is fastened to the casing end. A spring V³ tends to normally hold the angled end of the lever V² in engagement with said teeth.

The lever actuated mechanism described is for the purpose of causing the two lamp posts to be given axial movements, to throw the lamps into different positions.

The means for tilting the rock shaft C comprises a bracket D² rising from one of the shell sections D and to which is pivoted the end of the rod D³, which in turn is pivoted to a crank arm D⁴, fastened to a rock shaft J', which is journaled in the hollow shaft D⁵. A rod J² is fastened to the crank arm D⁶ fixed to the shaft J' and in turn is pivoted to the lever K pivotally mounted upon the pin K' upon the segment O, which latter is fastened to the casing N.

By the provisions in the mechanism shown, it will be noted that through the medium of the lever V, the two lamps may be thrown to one side or the other independent of the rocking of the shaft C. When it is desired to rock the shaft C, it may be accomplished by swinging the lever K upon its pivot and which, through the mediums of the connections shown, will cause the hollow shaft and housings connected thereto to rock, and at the same time tilt the lamps which are carried thereby.

What I claim to be new is—

1. A manually-operated mechanism for actuating dirigible lights for vehicles, comprising a hollow shaft, shell sections secured thereto and forming housings, and adapted to rock collars having bosses thereon journaled in openings in said shell sections, lamp posts having squared portions engaging similar outlined openings in said collars, a crank arm fastened to the projecting end of one post, bar connections between said collars, a hollow rock shaft, journaled on the side bar of the vehicle, a crank arm upon the rock shaft, pivotal rod connections between said arms, lever actuated mechanism for rocking said rock shaft, and means for rocking the shell sections, as set forth.

2. A manually-operated mechanism for actuating dirigible lights for vehicles, comprising a hollow shaft, shell sections secured thereto and forming housings, and adapted to rock collars having bosses thereon, journaled in openings in said shell sections, lamp posts having squared portions engaging similar outlined openings in said collars, a crank arm fastened to the projecting end of one of said posts, rod connections between the collars, a hollow rock shaft journaled on the side bar of the vehicle, a crank arm upon the rock shaft, pivotal rod connections between said arms, lever actuated mechanism for rocking the hollow shaft, a bracket arm projecting from one of the said shell sections, a solid rock shaft journaled in said hollow rock shaft, and a lever mechanism for operating said solid shaft, as set forth.

3. A manually-operated mechanism for actuating dirigible lights for vehicles, comprising a hollow shaft, complemental shell sections fastened together and secured to the ends of said shaft, brackets attached to the side bars of the vehicle, and to which said shell sections are pivotally connected, a hollow rock shaft journaled upon the side bar of the vehicle, and solid rock shaft journaled in the hollow rock shaft, crank arms secured to said rock shaft, pivotal rod connections between the said solid rock shaft, and a bracket upon a shell section, a lever upon the steering casing, and pivotal rod connections between the same and the solid rock shaft, collars journaled in said shell sections and lamp posts secured to said collars, and a lever actuated mechanism for rocking the collars and posts, carried thereby, as set forth.

4. A manually operated mechanism for actuating dirigible lights for vehicles, a steering shaft, a casing in which the same is mounted, a shell journaled upon said casing and provided with a diagonal slot, a bar having a pin at one end positioned within said slot connections, a rocking shaft and housings thereon, collar journaled in said housings, lamp posts mounted in said collars, and connections intermediate the latter and said pin carrying bar.

In testimony whereof I hereunto affix my signature in presence of two witnesses.

JOHN HENRY REED.

Witnesses:
EVA N. BERTHOLD,
CLARK GOOD.